UNITED STATES PATENT OFFICE.

MIKAL FJELLANGER, OF HVALSTAD, NEAR CHRISTIANIA, NORWAY, ASSIGNOR TO NORSK HYDRO-ELEKTRISK KVAELSTOFAKTIESELSKAP, OF CHRISTIANIA, NORWAY.

FERTILIZER AND PROCESS FOR THE MANUFACTURE OF THE SAME.

1,340,708. Specification of Letters Patent. Patented May 18, 1920.

No Drawing. Application filed February 6, 1920. Serial No. 356,690.

*To all whom it may concern:*

Be it known that I, MIKAL FJELLANGER, a subject of the King of Norway, residing at Hvalstad, near Christiania, Norway, have invented certain new and useful Improvements in Fertilizers and Processes for the Manufacture of the Same; and I do hereby declare the following to be a full, clear, and exact description of the invention, such as will enable others skilled in the art to which it appertains to make and use the same.

This invention has for its object a fertilizer and a process for the manufacture of the same.

It is known that urea nitrate in aqueous solution or in a moist condition has strongly acid properties.

This involves various disadvantages when the substance is to be employed as a fertilizer. It is obvious that the soil is liable to become acid in the proximity of the plant roots because it does not usually contain a sufficient proportion of bases to neutralize the acid. Another disadvantage consists therein that the bags used as packing for the material are liable to be destroyed in moist air.

According to the present invention these difficulties are overcome by mixing the urea nitrate with calcium carbonate. When a fertilizer comprising urea nitrate and calcium carbonate is brought into the soil and becomes moist a reaction takes place which may be illustrated by the following equation.

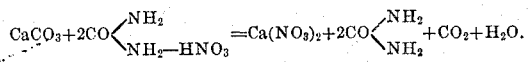

The fertilizer besides being free from the drawbacks above specified also has the following advantages:

When the fertilizer is brought into moist soil and the components of the mixture enter into reaction, a soluble calcium salt (calcium nitrate) is formed which is recognized as an excellent fertilizer especially on soil poor in lime. The free urea is also an excellent fertilizer. Moreover carbonic acid will be evolved and assists in dissolving the other plant nutrients which may be present in the soil without injuring the plant roots. The carbon dioxid in the soil also in other respects has an advantageous influence upon the growth of the plants.

The fertilizer obtained as above described is very rich in nitrogen so that the freight and packing expenses will be low. When the fertilizer is produced from pure raw materials and in the proportion shown by the above equation it will contain 23 per cent. of nitrogen. It may be of advantage however to maintain a somewhat lower percentage of nitrogen and to use cheaper raw material such as pulverized limestone, marble and the like. It is obvious, that it is not necessary to add calcium carbonate in such a high proportion as shown by the equation, when the soil is of such a character, that it is able to neutralize a proportion of the nitric acid supplied.

Claims:
1. Fertilizer comprising urea nitrate and calcium carbonate.
2. Process for the manufacture of a fertilizer which comprises mixing finely divided calcium carbonate with urea nitrate.
3. A fertilizer comprising urea nitrate and lime stone.
4. A fertilizer comprising urea nitrate and marble dust.
5. A fertilizer comprising urea nitrate and calcium carbonate sufficient to neutralize the nitric acid when liberated by moisture.

In testimony that I claim the foregoing as my invention I have signed my name in presence of two subscribing witnesses.

MIKAL FJELLANGER.

Witnesses:
NATH. A. HEDENCHON,
ROBERT H. FRAZIER.